US006959898B1

(12) United States Patent
Laughlin et al.

(10) Patent No.: US 6,959,898 B1
(45) Date of Patent: Nov. 1, 2005

(54) CABLE SUPPORT AND DISTRIBUTION SYSTEM AND METHOD

(75) Inventors: Raymond S. Laughlin, Garfield Heights, OH (US); John A. DiFrancisco, Twinsburg, OH (US); Edward J. Lynch, Jr., Akron, OH (US)

(73) Assignee: Erico International Corporation, Solon, OH (US)

( * ) Notice: Subject to any disclaimer, the term of this patent is extended or adjusted under 35 U.S.C. 154(b) by 817 days.

(21) Appl. No.: 09/620,582

(22) Filed: Jul. 20, 2000

Related U.S. Application Data

(60) Provisional application No. 60/145,322, filed on Jul. 23, 1999.

(51) Int. Cl.[7] .................................................. F16L 3/06
(52) U.S. Cl. ............................ 248/60; 248/58; 248/65
(58) Field of Search ............................. 248/58, 60, 62, 248/69, 72, 74.3, 55; 211/113, 118; 52/11, 52/15, 16

(56) References Cited

U.S. PATENT DOCUMENTS

| | | | | | |
|---|---|---|---|---|---|
| 2,304,973 | A | * | 12/1942 | Vecchiola | 248/58 |
| 2,996,274 | A | * | 8/1961 | Marik et al. | 248/62 |
| 3,323,766 | A | * | 6/1967 | Schauster | 248/62 |
| 3,575,214 | A | * | 4/1971 | Bindel | 138/107 |
| 4,019,705 | A | * | 4/1977 | Habuda, Sr. et al. | 248/58 |
| 4,305,557 | A | * | 12/1981 | Kowalski | 248/62 |
| 4,413,799 | A | * | 11/1983 | Gabriel | 248/59 |
| 4,553,356 | A | * | 11/1985 | Pepper | 52/11 |
| 4,783,029 | A | * | 11/1988 | Geppert et al. | 248/74.1 |
| 4,934,634 | A | * | 6/1990 | Breeden, Jr. et al. | 248/59 |
| 5,215,280 | A | | 6/1993 | Tigrett | 248/68.1 |
| 5,271,585 | A | * | 12/1993 | Zetena, Jr. | 248/49 |
| 5,384,937 | A | * | 1/1995 | Simon | 24/295 |
| 5,535,554 | A | * | 7/1996 | Harris, Jr. | 52/12 |
| 5,617,678 | A | * | 4/1997 | Morandin et al. | 52/11 |
| 5,638,643 | A | * | 6/1997 | Demartini et al. | 52/11 |
| 5,740,994 | A | | 4/1998 | Laughlin | 248/68.1 |
| 5,961,081 | A | * | 10/1999 | Rinderer | 248/68.1 |

(Continued)

FOREIGN PATENT DOCUMENTS

EP 0 891 028 A2 2/1999

(Continued)

*Primary Examiner*—Ramon O. Ramirez
*Assistant Examiner*—Steven Marsh
(74) *Attorney, Agent, or Firm*—John W. Renner; Renner, Otto, Boisselle & Sklar

(57) ABSTRACT

A cable support system provides the organization and support for bundles or runs of communication or database cables, for example, avoiding the mess usually associated with the distribution of such cabling. The system is designed to be a low cost and easier to install tray, supporting runs or bundles of cable from a building structure such as a structural ceiling, beam, girder, or purlin, and above a suspended acoustical ceiling. The system is suspended by common threaded rod which supports a primary hanger having a generally rounded support symmetrically below the rod with one side openable so that a secondary hanger may be inserted in and fastened to the inside of the support. The secondary hanger is formed from a roll of flexible open plastic mesh having oriented strands secured to the inside of the primary hangers by spring clips. Plastic splice clips may be used to join lengths of such mesh, or may be used in the fabrication of various transitions or branches. A wire form transition to which the secondary hanger is secured by the splice clips includes bendable components and can be used to form curves, elbows, changes in elevation, or Tees, and the like.

44 Claims, 5 Drawing Sheets

U.S. PATENT DOCUMENTS

| | | | | | |
|---|---|---|---|---|---|
| 5,964,434 | A * | 10/1999 | Lynch, Jr. | 248/60 |
| 6,076,779 | A * | 6/2000 | Johnson | 248/49 |
| 6,224,025 | B1 * | 5/2001 | Alvarez | 248/58 |
| 6,247,871 | B1 * | 6/2001 | Nickel et al. | 403/396 |
| 6,470,129 | B1 * | 10/2002 | Wentworth et al. | 385/134 |

FOREIGN PATENT DOCUMENTS

| | | |
|---|---|---|
| EP | 0 891 028 A3 | 3/2000 |
| FR | 2 017 070 | 5/1970 |
| GB | 1066155 | 9/1965 |

* cited by examiner

CABLE SUPPORT AND DISTRIBUTION SYSTEM AND METHOD

This application is a continuation of a Provisional Application Ser. No. 60/145,322, filed Jul. 23, 1999.

This invention relates generally as indicated to a cable support and distribution system and method, and more particularly to a low cost support and distribution system for interior runs of telecommunications and like cable which is of simplified construction, and which can easily be installed, and more particularly retrofitted, above existing acoustical or grid ceilings, with the removal of only a few grid tiles. The invention also relates to a method of supporting and organizing such cable.

BACKGROUND OF THE INVENTION

UTP category 5 cable is a data or communications cable constructed of 4 unshielded twisted pairs of 24 AWG thermoplastic insulated conductors enclosed is a thermoplastic jacket. The pairs of copper wires are tightly twisted to achieve high speed transmission; the tighter the twist, the faster the possible transmission speed. While UTP is available in Category 3, 4, 5, or 6, the higher the number, the tighter the twist. The tighter the twist also helps reject electromagnetic interference. While many designers have selected category 3 for voice, and category 5 for data, the trend is to install category 5 or higher for all applications in commercial buildings. Other high performance cables are being developed.

As the computer and communications industries have grown, the organization and management of the cabling has become a serious problem. It has literally been dumped on the floor or dropped through walls, kinked around corners, or simply dropped on or dragged over the top of suspended ceilings. Cables such as UTP cables and fiber optic cables simply cannot be treated in such a cavalier fashion and have the equipment they serve meet expectations.

For example cross-talk on a telephone may be due to improper cabling or cable placement. Attenuation, cross-talk, data distortion, and return loss all affect signal strength which can degrade any system transmission capability. Attenuation is the loss of power or signal strength along the transmission medium. Cross-talk is an unwanted transmission from another nearby cable, or even a pair in the same cable. Return loss is a measure of degree of impedance between the cable and a connector. Background noise is also an irritating problem resulting from a low signal-to-noise ratio. Inadequate cable installation is a key reason for such factors, especially when data and voice transmission speeds are continually being increased, for example from 16 Mhz to 100 Mhz or more.

Such cable should not be kinked, snaked, bent sharply, tugged, sag excessively, or come into engagement with sharp edges, or be too close to power cables.

The wiring can be placed under the floor with elevated flooring which is extremely expensive and often not practical. A more common place for such wiring is above the ceiling between the structural floor or roof above, and a dropped or acoustical ceiling.

The area above many acoustical or drop ceilings is usually cluttered with structural members such as beams or open joists, utilities such as plumbing or sprinkler systems, HVAC ducts, conventional power wiring, often encased in conduit or armored, and of course the suspension hangers for the ceiling and any lighting or other fixtures in the ceiling.

Moreover, most beams, joists and other structures extend in a rectilinear fashion above a ceiling, while communications or data cable usually radiates from a panel or closet in a star topology.

Conventional power wiring clips, snaps, wire hooks, bridle rings, or plastic ties are not suitable for such cable because of a variety of factors. They may present sharp edges or produce sharp turns or kinks in the cabling, or they may crush or pinch a bundle.

One specialized support for such telecommunications cable is shown in applicants prior U.S. Pat. No. 5,740,994 which can be attached to a variety of building structures above a suspended ceiling or even supported to extend upwardly from a ceiling grid. Such support is sold by Erico Inc. of Solon, Ohio under the trademark CABLECAT™.

If the building is being built new and is being designed with such cable in mind, cable trays are often employed. These are simply suspended or cantilevered trays in which such cable can be laid flat to extend horizontally, and are hung or suspended from beams, joists, or decking for example, oftentimes by trapeze hangers. Such trays are expensive and can be retrofitted into existing building, but not easily or economically, particularly if there is not a significant amount or extent of open or unobstructed horizontal space.

More conventional cable tray clamps and hardware for both power and communication cables are sold under the well known CADDY® trademark. CADDY® is a registered trademark of Erico International Corporation of Solon, Ohio. These trays require a substantial amount of hardware and are best installed as the building is being constructed and before any acoustical or suspended ceiling is installed. Also such cable tray systems are more easily installed parallel to a structural member such as a beam, or transversely as with the aid of a trapeze. Flexibility and retrofitability are not particularly characteristic of these conventional cable tray systems.

Somewhat more flexibility is achieved with wire grid trays or systems. These still are costly and require a number of parts, and cannot be retrofitted above an existing ceiling without substantially dismantling the ceiling. They are more costly, more costly to install, and more costly to retrofit above an existing drop ceiling.

Traditional cable trays are usually made up of rigid aluminum or steel tray sections, which come in varying lengths that are connected together and attached to the building structure, while the newer "flexible" cable trays are predominately made up of wire-form cross sections that, again, come in varying lengths. Both types share a similar disadvantage, in that the lengths provided are difficult to manage, and practically impossible to install over an existing drop ceiling without removing entire sections of the T-grid and cross brace system. In addition, splices may require the installer to use several different tools to complete the splice, making them complicated and time-consuming to install.

One flexible wire form system indicates it can create any angle or avoid any obstacle with a pair of bolt cutters. This is hardly the type of tool which can be used easily, if at all, above a suspended ceiling without dismantling the whole ceiling.

Also, such wire form systems may be supported in the center of the wire form tray. Thus for symmetrical loading there may be two bundles or sets of cables, one on each side of the center support. One has to be loaded from one side while the other from the other side. This makes changes, additions, or transitions to the system more difficult.

Accordingly, it would be desirable to have a flexible support and distribution system with few parts which could be installed above an existing ceiling without substantially dismantling the ceiling, and which provides easy access to the entire width of the support and distribution system from one side.

SUMMARY OF THE INVENTION

A cable support system provides the organization and support for bundles or runs of communication or datacom cables, for example, which avoids the common problems and mess usually associated with the distribution of data and communication cabling. The system is designed to be a low cost and easier to install cable tray, supporting runs or bundles of cable from a building structure such as a structural ceiling, beam, girder or purlin, and above a suspended acoustical ceiling. The system is suspended by common threaded rod from a wide variety of fasteners hanging the rod from the various structures. The rod supports a primary hanger which includes an upwardly opening generally rounded trough-shape support symmetrically below the rod with one side of the support extending integrally to the rod connection. The other side of the primary hanger is open so that a secondary hanger may be inserted and fastened to the inside of the upwardly opening support. This makes the entire cross section of the tray accessible from one side. The secondary hanger is preferably formed from rolls of flexible open plastic mesh having oriented strands. The length of the secondary hanger forms an upwardly opening trough supported by spaced primary hangers. The mesh is secured to the inside of the primary hangers by spring clips, and plastic splice clips may be used to join rolls of such mesh, or may be used in the fabrication of various transitions or branches. When the cable is in the trough formed by the secondary hanger, the open side of the hanger is closed by a connecting strap which also symmetrically transfers the load to both sides of the upwardly opening support or primary hanger. In addition to the five components noted, a sixth component in the form of a wire rod form transition fabrication may be employed to form curves, corners, Tees, or even changes in elevations. The transition comprises a center form support like the primary hanger but of wire rod form with a horizontal eye vertical axis hole formed at the top and a vertical eye horizontal axis hole at the opposite end. The eye at the top accommodates a threaded rod and the vertical eye accommodates the strap as with the primary hanger. A bottom center bendable strut or bar extends on each side of the center support, and upwardly extending trough-shape supports are mounted on the bendable strut on each side of the center support. The trough-shape supports at each end are paired and an end of the secondary hanger may be secured to said paired supports by the plastic splice clips described above. Intermediate trough-shape supports may be used to anchor the end of a secondary fastener in the formation of a Tee intersection.

The secondary mesh hanger may terminate at each end or may extend through the transition with a flap simply cut out at the Tee intersection. The system is inexpensive and may be installed above suspended ceilings without removing the grid or frame work.

DETAILED DESCRIPTION OF THE PREFERRED EMBODIMENTS

Figure 1:
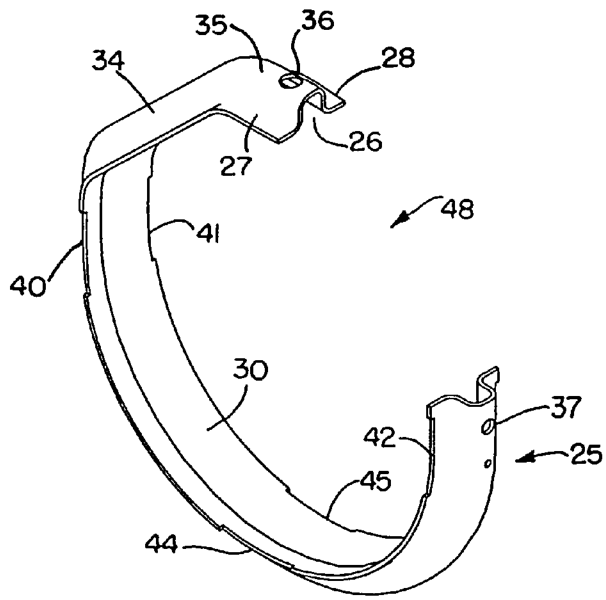
FIG. 1 is a perspective view of the primary support hanger bracket of the system.
Figure 2:
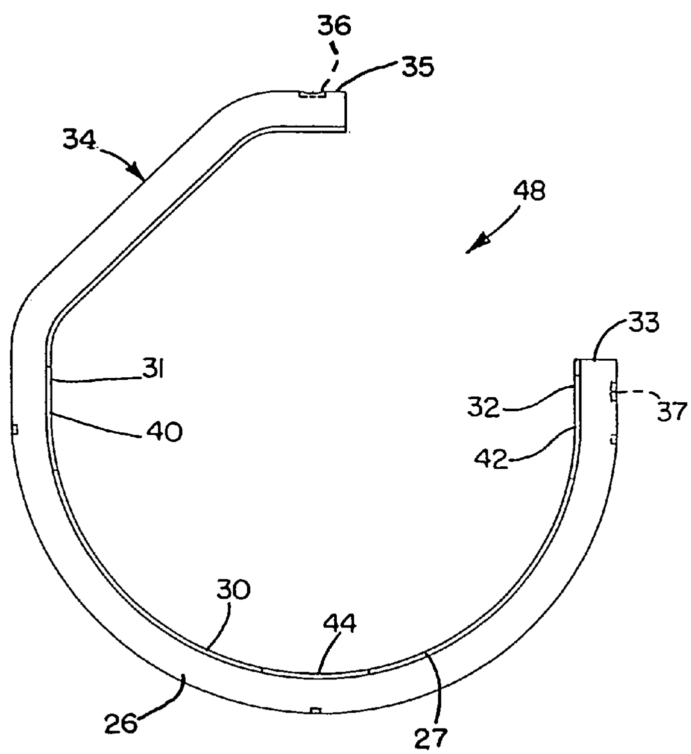
FIG. 2 is an axial elevation of the hanger.
Figure 3:
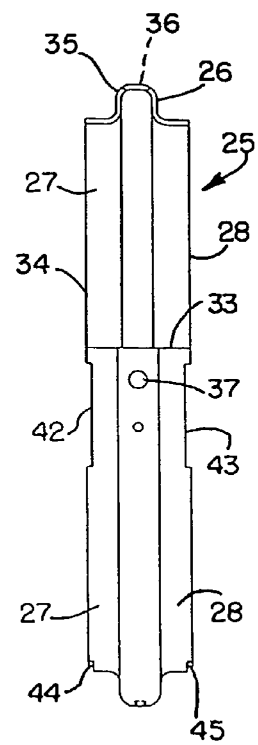
FIG. 3 is a side elevation of the hanger as seen from the right hand side of FIG. 2.

Referring initially to FIGS. 1–3 there is illustrated a primary hanger or bracket shown generally at 25. The hanger may be formed of steel and galvanized. Throughout its length, the hanger is of a substantially uniform channel shape which has a center outwardly extending channel 26 and two relatively long outwardly projecting coplanar flanges 27 and 28 on each side thereof. The bottom of the hanger forms a generally semi-circular upwardly opening trough-shape saddle or support 30 with two straight or vertical portions 31 and 32 on each end thereof. The straight portion 32 terminates at the edge 33 while the straight portion 31 continues upwardly to an angle portion 34 which terminates at the top in a horizontal short section 35. The base of the channel is provided with a top hole indicated at 36.

The opposite end just short of the edge 33 is also provided with a hole seen at 37 in the base at the center channel. As later described, the primary hanger or bracket may be hung from a threaded rod extending through the hole 36 at the desired elevation and orientation with respect to an overhead structural element of the building.

The axially extending flanges of the primary hanger are provided with edge notches at one side seen at 40 and 41, at the opposite side as seen at 42 and 43, and in the center bottom as seen at 44 and 45. These edge notches accommodate spring snap clips as will be described.

Figure 4:
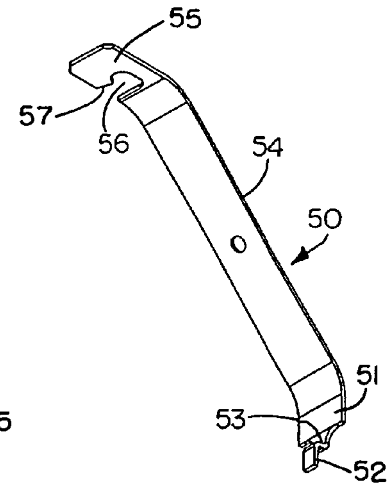
FIG. 4 is a perspective view of the enclosing retaining strap for the primary support hanger.

It will be seen that the configuration of the primary hanger is such that the upwardly opening generally semi-circular support surface 30 is symmetrical about the axis of the top hole 36 and that a substantially open side is provided as seen at 48. After the secondary hanger or open mesh is secured in place inside the semi-circular support and the cable runs or bundles are positioned within the secondary hanger, the open space 48 may be closed by the retaining strap seen generally at 50 in FIG. 4.

The retaining strap 50 includes a vertical lower end 51 which terminates in a relatively narrow dogleg or tab 52 inwardly offset by shoulder 53. The main body portion of the strap shown at 54 extends upwardly at an angle of about 45° which is the same angle of inclination of the section 34 of the primary hanger. The top of the strap terminates in a horizontal portion 55 which includes on one side a bayonet notch 56 with the outermost edge of the notch being slightly inclined or forming a cam surface 57. As will hereinafter be described the strap is simply attached to the primary hanger by inserting the tab or dogleg 52 into the hole 37 and then rotating the top upwardly to snap onto the threaded rod above the upper end of the primary hanger to be secured in place by conventional nut fasteners. The strap then provides symmetrical hanging support for both sides of the upwardly opening support 30 as well as enclosing the trough or cable tray formed.

Figure 5:
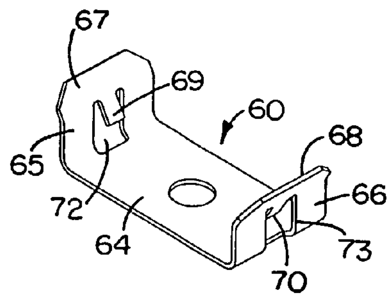
FIG. 5 is a perspective view of the spring clip used to secure the secondary cable containment to the primary hanger.
Figure 6:
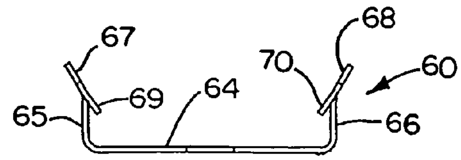
FIG. 6 is an edge elevation of the clip of FIG. 5.
Figure 9:
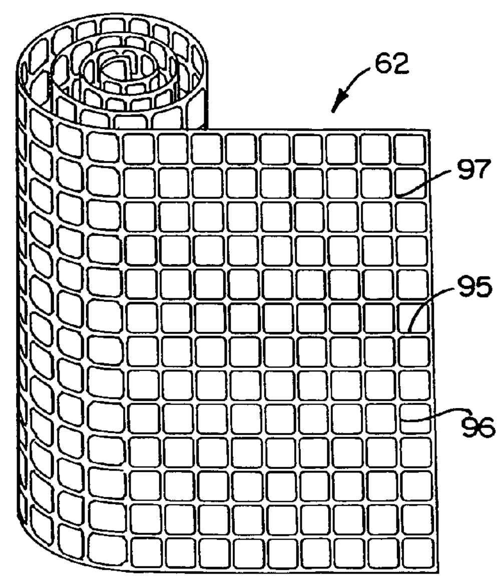
FIG. 9 is a view of a roll of mesh forming the secondary hanger.

Referring now to FIGS. 5 and 6 there is illustrated a spring snap clip shown generally at 60 which is employed in connection with the flange edge notches to secure the secondary hanger or open flexible mesh seen at 62 in FIG. 9 to the interior of the primary hanger 25. The spring snap clips each include a generally flat surface 64 with legs 65 and 66 bent in the same direction. The tips of the legs are bent outwardly or away from each other as 25 shown at 67 and 68, respectively. Extending generally coplanar to the outwardly flared tips of the legs of the clip are inwardly struck tangs seen at 69 and 70. These tangs may be struck from the outer edges of holes 72 and 73. The profile configuration of the edges and tangs is seen more clearly in FIG. 6. The spring clips are such that they may simply be pushed on the notch edges such as seen at 44 and 45 so that such edges cam the legs apart with the tangs 69 and 70 snapping over the notch edges. Once in place the notches keep the snaps from moving or sliding circumferentially of the primary hanger. The clip seen in FIGS. 5 and 6 is made of spring steel.

Figure 7:
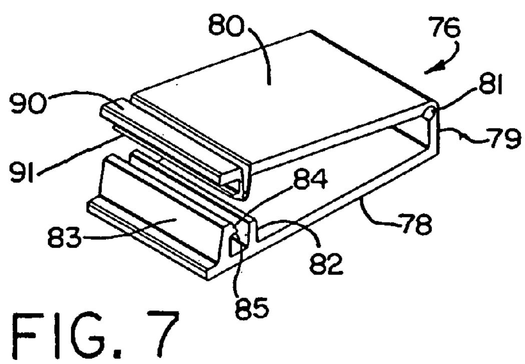
FIG. 7 is a perspective view of the splice clip used to connect the end of one roll of secondary hanger containment mesh to the end of another roll.
Figure 8:
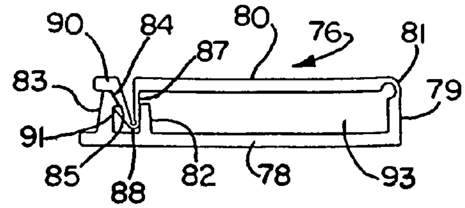
FIG. 8 is an edge view of the clip of FIG. 7 closed.

FIGS. 7 and 8 illustrate a splice clip shown generally at 76. The splice clip as hereinafter described is designed to secure the end of one roll of such mesh or fabric 62 to the beginning of the next roll, or to fabricate curves, elbows, Tees, branches or even changes in elevation with the transition hereinafter described.

The splice clip seen in FIGS. 7 and 8 is made of a plastic material such as polypropylene and includes a flat base 78 which has a relatively short rear wall 79. The rear wall is connected to the top wall or outer corner 80 by a hinge 81. At the front of the base 78 there is provided a relatively shorter ridge wall 82 and forwardly spaced therefrom a catch wall 83 which has a sloping interior outer edge 84 which terminates in a catch shoulder 85. The outer cover 80 terminates in an inwardly projecting relatively thin wall 87 which is hinged at 88 to outwardly extending flex edge 90 which includes a forwardly projecting catch 91 adapted to snap under the catch 85 when the splice clip is closed as seen in FIG. 8. The splice clip can be opened or released simply by elevating the forward edge 90 pivoting clockwise about pivot or hinge 88 as seen in FIG. 8 to disengage the two latches. The clip can be closed simply by pressing the cover 80 down which encloses the interior space 93. The clip will readily accommodate within the opening 93 a number of strands of the open mesh secondary hanger fabric or even accommodate wire forms. The interior opening top-to-bottom of the clip 76 is approximately a quarter of an inch (6.35 mm), while the interior length of the opening 93 is approximately 1.4 inches (31.2 mm).

Although other types of fabric may be employed, the preferred open mesh fabric is seen at 62 in roll form in FIG. 9. It will be seen that the fabric 62 is formed of longitudinal strands 95 and transverse strands 96. These strands are preferably oriented high density polyethylene extruded with approximately 10% fiber reinforcing added. The strands are welded to each other to form nodes shown generally at 97. The thickness of the strands may be typically 0.14 (3.6 mm) inches while the rectangular or square openings are approximately 1 square inch (2.54 $cm^2$). This provides a mesh that is approximately 60% to 90% voids. Although other forms of mesh fabric may be employed, the square open mesh illustrated is preferred for a variety of reasons. One reason is the reduced material involved which in the case of fire minimizes the creation of fumes. Also, a substantially open nature of the mesh does not act as an impediment to any sprinkler system which might be above a suspended ceiling. The open mesh also permits visibility of the cables or bundles within the open trough being formed. Cables are sometimes color coded and the open mesh may facilitate the location of a cable without completely dismantling the system or a bundle within the trough formed. In addition, the open mesh with the relatively large voids facilitates the branching of cables from the trunk or run within the trough. The cables may simply be branched through the openings in the mesh and if the opening is not sufficiently large for the number of cables involved, the opening can readily be enlarged with scissors or snips. The preferred mesh comes in rolls which are approximately 15 inches wide (38.1 cm) and 25 feet in length (76.2 decimeters).

Figure 10:
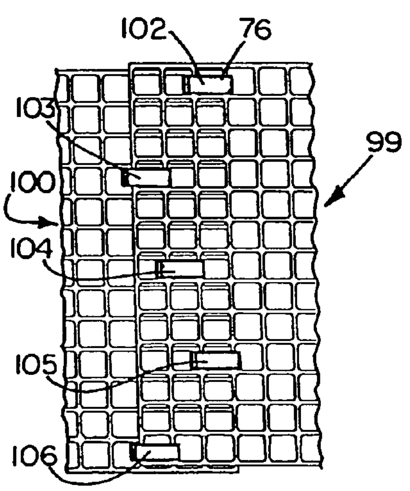
FIG. 10 is an illustration of how the roll ends are connected using the clips of FIGS. 7 and 8.

The material of such rolls can be joined end-to-end using the splice clips of FIGS. 7 and 8 as seen in FIG. 10. In FIG. 10, the end of one roll is seen at 99 on one side, while the end of another roll is seen at 100 on the opposite side. The fabric is slightly offset for visibility. Splice clips 76 seen at 102, 103, 104, 105, and 106 are employed to join the fabric ends. It is noted that each splice clip is locked about four parallel strands, two from each of the overlapping mesh or fabric ends.

Figure 11:
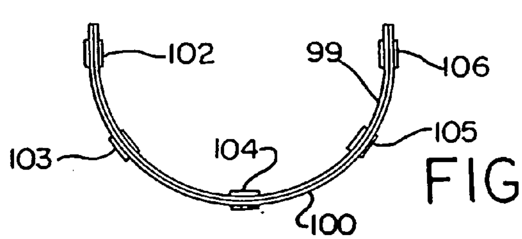
FIG. 11 is a transverse view through the roll ends showing the trough-shape of the secondary mesh containment conforming to the shape of the primary hanger.

FIG. 11 illustrates the two rolls joined and the positioning of the splice clips as the two fabric sections are longitudinally formed into the upwardly opening trough or saddle section conforming to the interior of the primary hanger. FIG. 11 illustrates the trough configuration of the secondary hanger when conforming to and supported by the interior of the primary hanger.

Figure 12:
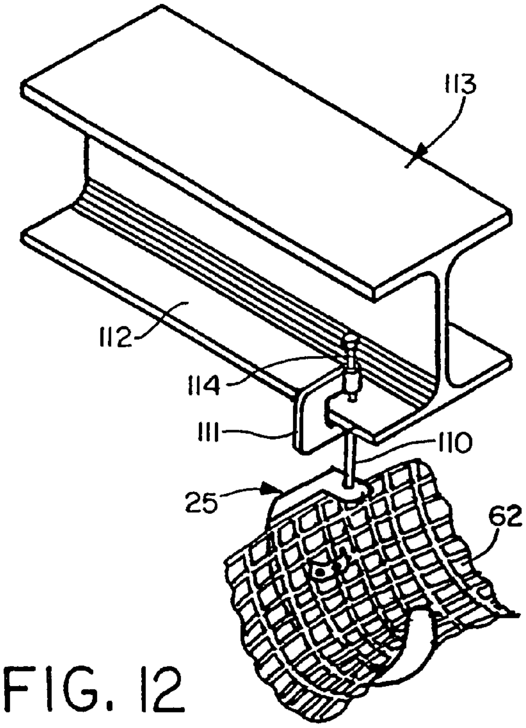
FIG. 12 is a fragmentary perspective view showing the mesh conforming to the interior of the primary hanger.
Figure 13:
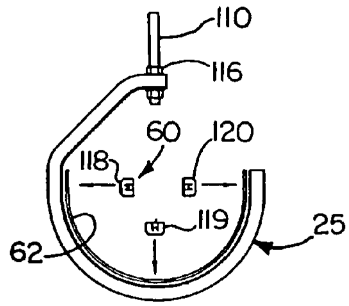
FIG. 13 is a transverse axial view showing the support mesh supported by the interior of the primary hanger.
Figure 14:
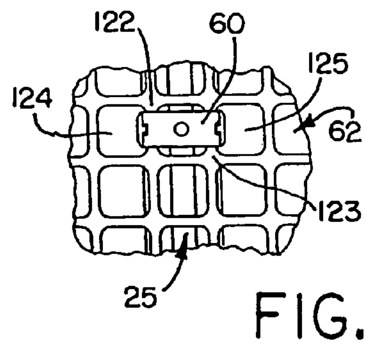
FIG. 14 is an enlarged interior view of the clip securing the mesh to the hanger.

Referring now to FIGS. 12, 13, and 14 it will be seen that the primary hanger shown generally at 25 is suspended by threaded rod 110 from a rod hanger clamp 111 fastened to the lower flange 112 of I-beam 113. The fastener 111 is held in place on the projecting flange 112 by screw clamp 114.

As seen in FIG. 13, the lower end of the rod 110 is secured to the upper end of the primary hanger 25 by nuts shown generally at 116 both above and below the hole 35. Washers may also be employed. With reference to such figures it will be seen that the mesh fabric 62 has been bent to conform to the interior of the primary hanger and forms the elongated upwardly opening trough shown. The mesh fabric is secured to the interior of the primary hanger by three spring clips 60 seen in FIG. 13 at 118, 119, and 120. The spring clips are simply moved in the direction of the generally radially extending arrows shown to embrace preferably at least two parallel strands of the mesh fabric and snap over the notch edges shown more clearly in FIGS. 1, 2, and 3.

FIG. 14 illustrates the snap clip 60 embracing transverse strands 122 and 123 of the mesh 62 with the legs of the snap clip projecting through the voids or openings 124 and 125 in the flexible fabric securing the fabric to the interior of the primary hanger 25. As illustrated, three clips are employed, two securing the edges of the fabric to the upper portions of the hanger while the third secures the center of the fabric to the bottom of the hanger. The tensile strands of the fabric as well as the trough-shape provide flexibility, yet supporting strength for the portion of the secondary hanger which extends between the primary hangers.

Figure 15:
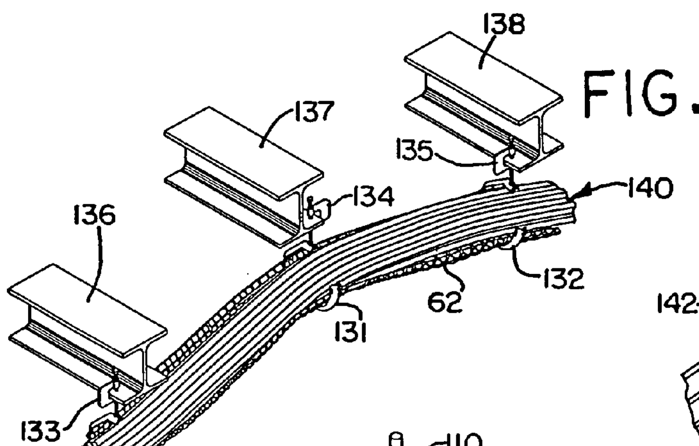
FIG. 15 is a fragmentary view of system installed and the cables being placed in the system.

Referring now to FIG. 15, there is illustrated three primary hangers shown generally at 130, 131, and 132 supported from threaded rods from beam flange clamps 133, 134, and 135, respectively, secured to the flanges of beams 136, 137, and 138, respectively. It is noted that the alignment of the primary hangers is not perfect and there is substantial offset or curvature in the alignment. This indicates the type of flexibility or deviation which can be achieved by the support system of the present invention. FIG. 15 illustrates a cable bundle shown generally at 140 positioned within the secondary or open mesh hanger 62 in turn supported by the spaced primary hangers at 130, 131, and 132.

Figure 16:
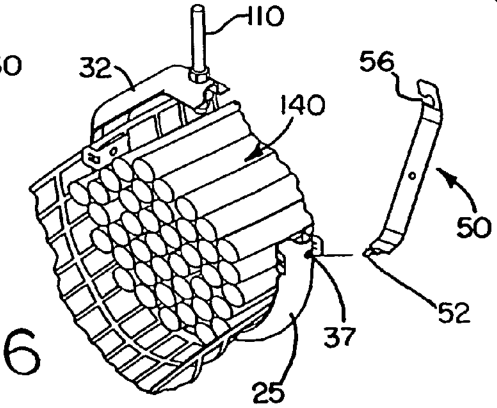
FIG. 16 is a slightly enlarged view of the retaining strap being installed on the main or primary hanger.
Figure 17:
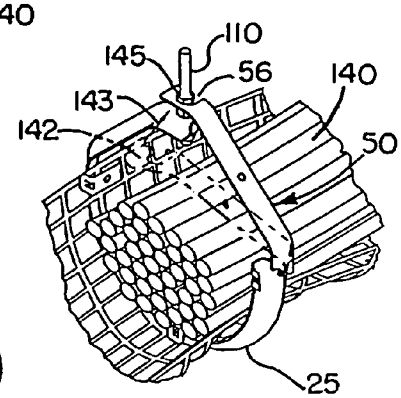
FIG. 17 is a similar view showing the strap secured in place.

After the bundle 140 is within the trough or secondary hanger 62 supported in turn by the primary hangers, the trough may be closed by assembling the retaining strap 50 as seen in FIGS. 16 and 17. In FIG. 16 the tab or dogleg 52 is inserted in the hole 37. The strap may then pivot from the phantom line position seen at 142 in FIG. 17 in the direction of the arrow 143 to snap the bayonet notch 56 on the rod 110. When the notch 56 is in place on the threaded rod it is simply tightened down or clamped with suitable hardware 145 such as the nut illustrated in the final position seen in full lines in FIG. 17. The primary hanger is then supported symmetrically from the center threaded rod 110 and also the trough formed by the secondary hanger supported in turn by the primary hanger has been enclosed.

It can be seen that the components of the system so far described are the primary hanger and it's strap, the secondary hanger in the form of the open mesh or fabric, the metal clip for securing the secondary hanger to the primary hanger, and the plastic splice clip for connecting sections of the secondary hanger to each other. The splice clip is also employed to secure sections of the secondary hanger to a rod form transition seen generally at 148 in FIGS. 18–22.

Figure 18:
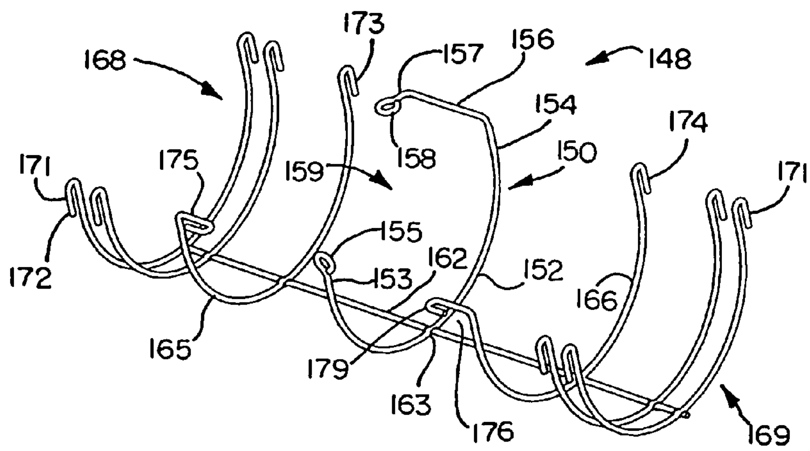
FIG. 18 is a perspective view of a transition.
Figure 19:
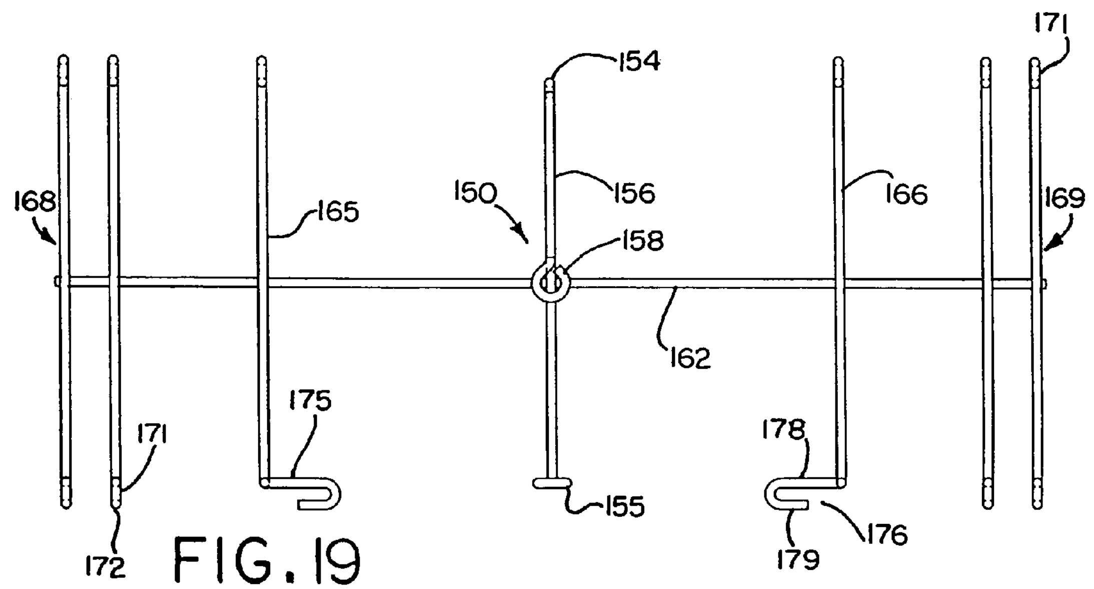
FIG. 19 is an enlarged top plan view of the transition.
Figure 20:
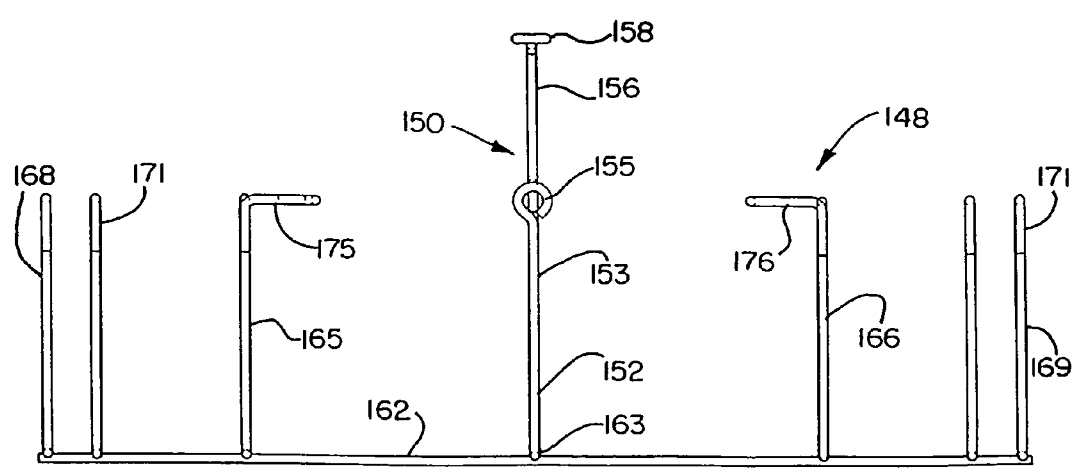
FIG. 20 is a similar front elevation of the transition as seen from the bottom of FIG. 19.

With initial reference to FIGS. 18–20 it will be seen that the transition is a wire rod form fabrication which includes a center form shown generally at 150 which has generally the same profile configuration as the primary hanger 25. The center form includes a generally semi-circular upwardly opening trough-like support 152 with relatively short vertical extensions 153 and 154 at each side thereof. The extension 153 terminates in a eye 155, the hole of which has a horizontal axis. The other side of the center form continues upwardly to the inclined portion 156 which terminates in relatively short horizontal leg 157 terminating in eye 158 with the hole having a vertical axis. The axis of the hole of the eye 158 is centered over the upwardly opening trough-like support 152. In this manner the center support has the same profile configuration as the primary hanger seen in FIGS. 1–3 and has a vertical axis hole at the top center and a horizontal axis hole at the opposite end. The holes formed by the eyes 155 and 158 then generally correspond to the holes 37 and 36, respectively seen in FIGS. 1–3. This enables the strap 50 seen in FIG. 4 to be employed in the same manner to close the open side 159 of the center form 150.

Extending transversely of the center form or longitudinally of the entire transition is a bottom center strut or bar 162 which is welded to the underside of the center form at 163. Also secured to the center bar or strut 162 are symmetrically positioned left form 165 and right form 166. Also secured to the ends of the center bar or strut 162 are paired end forms seen at 168 and 169, respectively. The intermediate left and right forms 165 and 166 as well as the paired end forms all have the same general upwardly opening profile or trough-shape configuration and all are secured at their centers by welding to the top of the center bar or strut 162.

The upper ends of the end forms terminate in U-shape bends seen at 171. Such U-shape bends terminate in downwardly extending outer legs that extend parallel to the balance of the form so that a strand of the secondary hanger can readily be inserted in the opening. The hooks are designed to be closed or shut simply be squeezing with a pair of plyers. While each of the paired end forms is provided with such hooks on both ends, the intermediate left and right forms are provided with similar hooks indicated at 173 and 174, but on the opposite end are provided with hooks 175 and 176 directed horizontally toward each other and opening away from each other. These hooks 175 and 176 include a right angle bend 178 which extends parallel to the bottom rod or strut 162 with the hook then being formed to terminate in the outer leg 179 parallel to the leg 178 and also the bottom rod or strut. These hooks again are designed to be closed by compression with a pair of plyers.

The wire form fabrication transition is formed with wire rod which may have a diameter of approximately 0.188 inches (0.48 cm or 4.8 mm) and the wire forms may readily be field bent to form a variety of curves, Tees, elbows, or even changes in elevation. The wire rod stock is designed to fit easily within the pocket or interior 93 of the splice clips seen in FIGS. 7 and 8. The spacing of the paired end forms is such that both forms of each pair will fit within the pocket 93 of the splice clip so that the splice clip will embrace both end forms as well as at least two strands of the secondary hanger 62.

Figure 21:
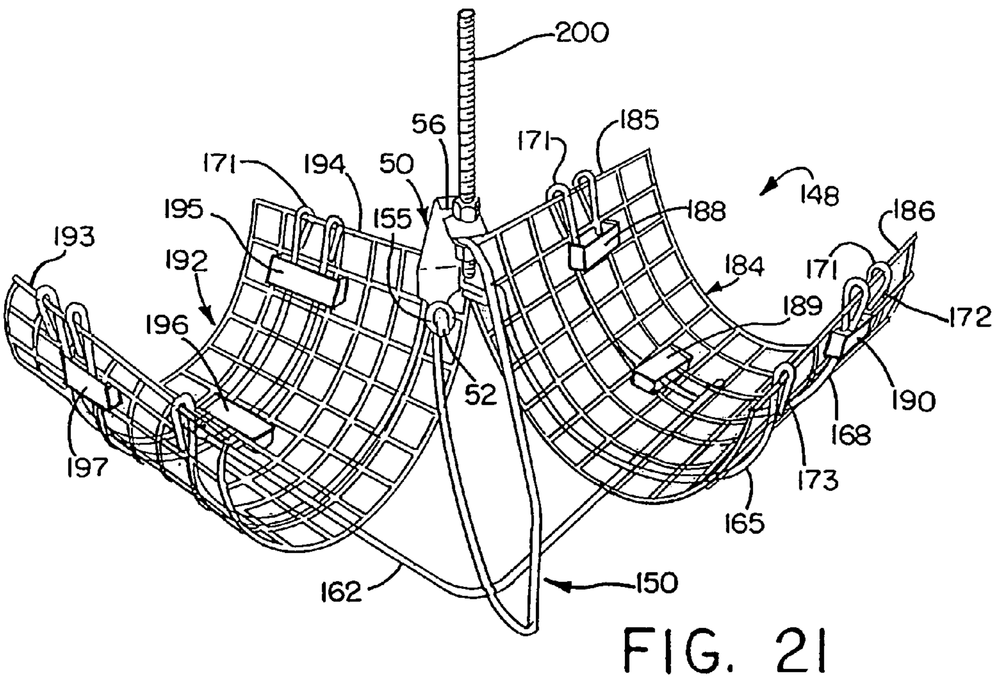
FIG. 21 is a perspective view of the transition forming an L or elbow.

Although it is not necessary that the secondary hanger extend completely through the transition, the secondary hanger may readily be secured to each end of the transition with the various hooks closed about the lateral edge strands of the secondary hanger, and the splice clips utilized to secure the secondary hanger to at least each paired end forms of the transition. The curvature may vary from a relatively sharp elbow such as seen in FIG. 21 to a larger radius curvature, and such desired curvature may readily be obtained by bending the center bar or strut 162 on each side of the center form. Similar bending may achieve a change in elevation or provide a grade on each side of the center form.

Referring now to FIG. 21 there is illustrated a transition 148 bent to form a relatively sharp curve or elbow. The center bar or strut 162 has been bent on each side of the center form 150. The end of one secondary hanger illustrated at 184 is secured to the right hand side of the transition as seen in FIG. 21. The edge strands 185 and 186 have been positioned in the hooks 171, and the hook ends 172 have been bent or crimped to enclose the edge strands. The same is true with the hook end 173 on the intermediate form 165. In addition, splice clips shown at 188, 189, and 190 are closed about parallel transverse strands of the secondary hanger 184 and also about the parallel paired wire rod forms of the end forms 168.

On the opposite leg of the transition, the end of the secondary hanger 192 is positioned within and secured to the transition in the same manner by positioning the edge strands 193 and 194 in the hooks 171 and crimping the same closed. Splice clips seen at 195, 196, and 197 are employed to embrace parallel strands of the mesh hanger 192 as well as the paired end forms. In this manner the two secondary hangers 192 and 184 may be joined essentially at right angles. Because of the relatively short bridge involved, the secondary hanger need not extend completely through the elbow.

The transition is supported by the threaded rod 200 which extends through the top eye 158 of the center form 150. The strap 50 extends from the eye 155 with the dogleg 52 projecting through the eye hole. The bayonet notch 56 is snapped on the rod 200 and the assembly is held in place by the nuts illustrated.

It will be appreciated that the degree of bending may vary from slight to the almost elbow illustrated and that the bottom center rod or strut 162 may also be bent so that changes in elevation may be accomplished.

Figure 22:
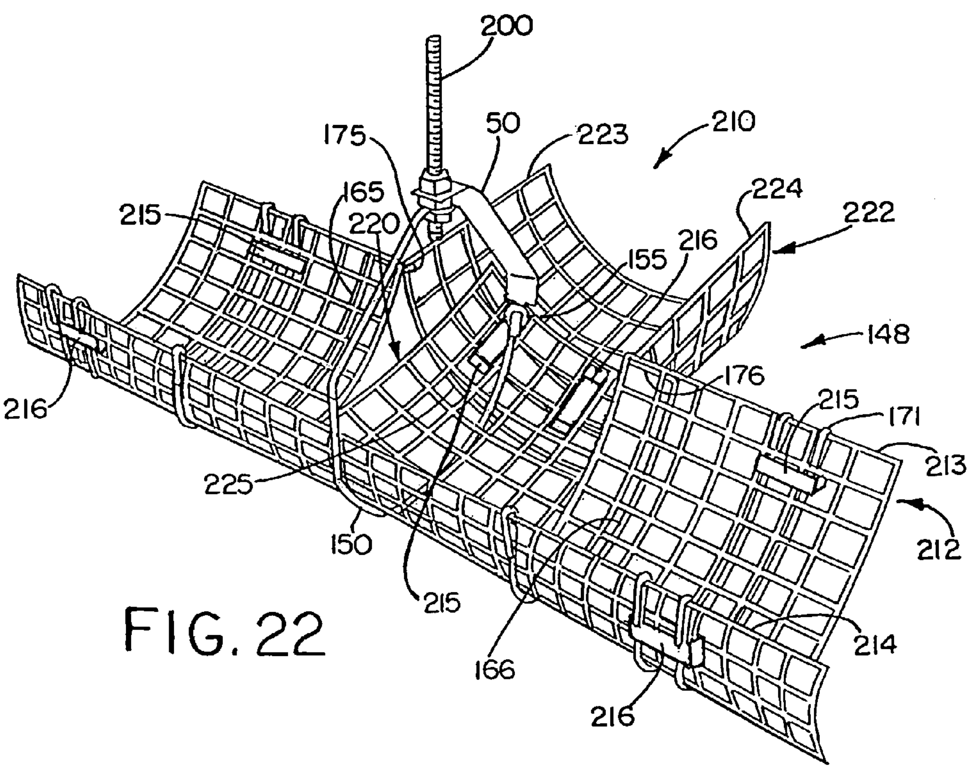
FIG. 22 is a perspective view of the transition forming a Tee.

Referring now to FIG. 22 there is illustrated a transition 148 forming a Tee shown generally at 210. In the Tee formation seen in FIG. 22 the bottom center rod or strut 162 has not been bent. Within the transition a secondary hanger shown generally at 212 is secured by bending the hooks 171 about the edge strands 213 and 214. The secondary hanger 212 is also secured in place by the splice clips shown at 215 and 216 at each end securing the secondary hanger to the paired end forms. If employed, the third splice clip at the bottom of the trough at each end is obscured. The secondary hanger has been cut to form a flap shown generally at 220. The flap has been threaded over the eye 155 of the center form and is attached to further secondary hanger 222 by the splice clips shown at 215 and 216.

The further secondary hanger is shown generally at 222 and extends normal to the secondary hanger 212. The edge strands 223 and 224 of the secondary hanger 222 at the corner with end strand 225 are engaged within the inwardly directed hooks 175 and 176 on the intermediate forms 165 and 166. It will be appreciated that the secondary hanger 222 will extend onto a primary hanger forming a run which extends normal to the run formed by the secondary hanger 212. In FIG. 22 the center form includes the strap 50 extending from the eye 155 to the rod 200 and held in place by the nut fasteners shown. Accordingly, a wide variety of constructions may be formed with the transition.

While the invention has been shown supported from steel I-beams, it will be appreciated that there are a wide variety of other structures from which the cable support and distribution system of the present invention may be suspended. These include girders, angle bars, a wide variety of purlins, or a metal or concrete deck. It will be appreciated that there are a wide variety of hangers which will suspend threaded rod from such structural members and that with the present invention a low cost easily fabricated support and distribution system for communications cable can readily be retrofitted above a suspended ceiling for the proper organization, care and distribution of such sensitive cable.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, wherein said flexible sheet material is an open mesh.

2. A system as set forth in claim 1 wherein said flexible sheet material is an open mesh having oriented plastic tensile strands.

3. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, including means to secure the flexible sheet material to the interior of each hanger at at least each edge of such sheet material.

4. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, including clip means to secure the flexible sheet material to the interior of each hanger at at least three equally spaced locations.

5. A system as set forth in claim 1 wherein said flexible sheet material is a plastic mesh which is mostly open.

6. A system as set forth in claim 1 wherein said flexible sheet material is a mesh at least 60%–90% open.

7. A system as set forth in claim 1 wherein said flexible sheet material is formed from rolls of said sheet material joined end-to-end.

8. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, wherein each hanger has a fixed arm continuing from the trough-shape bottom to a rod connection over the center of the hanger.

9. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, wherein said hanger includes a center rod connection integrally formed with one side of the hanger leaving the other side open for insertion of said flexible sheet material and the cable.

10. A cable support system comprising a series of hangers each having a supporting generally trough-shape bottom, and a flexible sheet material supported within each hanger and conforming to the trough-shape bottom and extending from hanger to hanger to form a longitudinal trough for supporting a bundle of cables therein, wherein said hanger includes a center rod connection integrally formed with one side of the hanger leaving the other side open for insertion of flexible sheet material and cable, and removable strap means operative to extend from the other side of the hanger to the center rod connection to close the open side and support both sides of the hanger symmetrically from the center rod connection.

11. A method of supporting and organizing a bundle of cables comprising the steps of supporting at least two primary hangers from building structures, each primary hanger including an upwardly opening trough-shape support, stringing between said primary hangers a flexible secondary hanger which is longitudinally flexed to conform to the upwardly opening trough-shape supports to form an upwardly opening trough between said primary hangers, and then laying cables into said upwardly opening trough to support a bundle of cables in organized fashion extending between said primary hangers.

12. A method as set forth in claim 11 including the step of securing said flexible secondary hanger to each trough-shape support.

13. A method as set forth in claim 11 including the step of providing the flexible secondary hanger with tensile resistant strands.

14. A method as set forth in claim 11 including the step of providing each primary hanger with a centered rod connection above the trough-shape support integrally connected to the support on one side thereof leaving the outer side open to receive the secondary hanger and one or more cables.

15. A method as set forth in claim 14 including the step of closing the other open side with a strap loading both ends of the trough-shape support from the rod connection.

16. A method as set forth in claim 11 including the step of fabricating the flexible secondary hanger from rolls of flexible material connected end-to-end.

17. A method as set forth in claim 16 including the step of forming the secondary hanger from rolls of plastic mesh.

18. A method as set forth in claim 17 including the step of connecting the rolls end-to-end with plastic clips.

19. A method as set forth in claim 18 wherein said mesh is formed of strands extending normal to each other, and enclosing at least two strands from each roll with said plastic clips to form the connection.

20. A method as set forth in claim 19 wherein said mesh is about 60%–90% voids.

21. A method as set forth in claim 12 including the step of securing the secondary hanger to said primary hanger at at least each edge of said secondary hanger.

22. A method as set forth in claim 12 including the step of forming the secondary hanger from open mesh, and using a snap clip to join the secondary hanger to the primary hanger, the snap clip extending through said mesh.

23. A method as set forth in claim 11 including the step of utilizing a wire form transition with said secondary hanger to form curves, elbows, and Tees.

24. A method as set forth in claim 23 including the step of providing the transition with a bendable horizontal bottom strut to obtain a desired curvature or change in elevation.

25. A method as set forth in claim 24 including the step of providing the transition with a center form to suspend the transition from a threaded rod.

26. A flexible cable support system comprising a series of primary hangers spaced from each other each including an upwardly opening support, a secondary hanger in the form of an elongated flexible sheet extending from hanger to hanger and shaped to conform to the interior of said upwardly opening supports, said secondary hanger forming an upwardly opening trough into which cables may be positioned for organization and support, wherein said flexible sheet secondary hanger is a stranded open mesh.

27. A support system as set forth in claim 26 wherein the strands of said mesh are oriented for tensile strength.

28. A support as set forth in claim 27 wherein said mesh is about 60%–90% voids.

29. A support system as set forth in claim 26 including fastener means to secure said flexible sheet secondary hanger to the interior of said upwardly opening supports.

30. A support system as set forth in claim 29 wherein said fastener means is a snap clip adapted to embrace one or more strands of said stranded open mesh sheet secondary hanger.

31. A support system as set forth in claim 30 wherein said snap clip includes spring legs adapted to snap on said upwardly opening support and extending through said open mesh sheet to clamp the sheet to the upwardly opening support.

32. A support system as set forth in claim 26 wherein said elongated flexible sheet is fabricated from rolls of said sheet material connected by splice clips which embrace strands of the joined mesh sheets.

33. A support system as set forth in claim 32 wherein said splice clips are flat plastic clips which may be closed about parallel strands of the joined mesh sheets.

34. A support system as set forth in claim 33 including a wire rod form transition, wherein said plastic splice clips have an interior which when closed is adapted to embrace parallel strands of the joined mesh sheets, as well as wire rods of said rod form transition.

35. A support system as set forth in claim 34 wherein said plastic splice clips include a movable projecting latch so that the clip can be opened for repositioning.

36. A flexible cable support system comprising a series of primary hangers spaced from each other each including an upwardly opening support, a secondary hanger in the form of an elongated flexible sheet extending from hanger to hanger and shaped to conform to the interior of said upwardly opening supports, said secondary hanger forming an upwardly opening trough into which cables may be positioned for organization and support, wherein each primary hanger includes a centered hanging connection integrally connected to one side of the upwardly opening support leaving the other side open to receive the secondary hanger and one or more cables.

37. A support system as set forth in claim 36 including a strap adapted to close the other open side and support both sides of the upwardly opening support from the centered hanging connection.

38. A support system as set forth in claim 37 wherein said centered hanging connection is a threaded rod connection.

39. A support system as set forth in claim 38 including a fastener hanging said rod from a building structure.

40. A cable tray comprising a trough-shape flexible sheet secondary hanger extending through and supported by a plurality of primary hangers, a transition support comprising a center support, and a bottom center bendable strut extending on each side of said center support, upwardly extending generally trough-shape supports on each side of said center support and secured to said bendable strut, and means to secure an end of said flexible sheet secondary hanger to said transition support so that said cable tray will be directed through transitions dictated by the bending of said strut.

41. A cable tray as set forth in claim 40 wherein said transition support is a rod form fabrication, and clip means operative to secure said secondary hanger to said transition support by embracing the rod form fabrication.

42. A cable tray as set forth in claim 41 wherein said trough-shape supports at each end of said strut are paired, with each of said pair fitting within said clip means.

43. A cable tray as set forth in claim 40 wherein said transition support is a rod form fabrication, and means to secure said secondary hanger to said transition support by bending said rod form fabrication.

44. A cable tray as set forth in claim 40 including a right and left trough-shape support symmetrically positioned on each side of said center support, and means to secure an edge of a secondary hanger to said right and left trough-shape supports to form the stem of a Tee.

* * * * *